United States Patent [19]

Póet al.

[11] Patent Number: 5,780,567
[45] Date of Patent: Jul. 14, 1998

[54] SYNDIOTACTIC TERPOLYMERS OF STYRENE

[75] Inventors: Riccardo Pó, Leghorn; Nicoletta Cardi, Novara, both of Italy

[73] Assignee: Enichem S.p.A., Milan, Italy

[21] Appl. No.: 649,320

[22] Filed: May 17, 1996

[30] Foreign Application Priority Data

Jun. 1, 1995 [IT] Italy .................. MI95A1138

[51] Int. Cl.⁶ .................... C08F 212/08; C08F 4/643
[52] U.S. Cl. .................... 526/347; 526/134; 526/159; 526/160; 526/161; 526/165; 526/916
[58] Field of Search .................... 526/347, 134, 526/159, 160, 161, 165, 133, 916

[56] References Cited

U.S. PATENT DOCUMENTS

| | | |
|---|---|---|
| 840,095 | 3/1907 | Pó . |
| 3,629,211 | 12/1971 | Nozaki . |
| 4,143,084 | 3/1979 | Kaeding et al. . |
| 4,698,405 | 10/1987 | Runavot . |
| 4,732,936 | 3/1988 | Holohan . |
| 5,066,741 | 11/1991 | Campbell . |
| 5,252,693 | 10/1993 | Ishihara et al. . |
| 5,502,133 | 3/1996 | Ishihara et al. .......... 526/347 |

OTHER PUBLICATIONS

European Search Report.

*Primary Examiner*—Fred M. Teskin
*Attorney, Agent, or Firm*—Nikaido Marmelstein Murray & Oram LLP

[57] ABSTRACT

Syndiotactic terpolymers of styrene comprising repetitive units deriving from:

a) 99.5–60% in moles of styrene; and
b) 0.5–40% in moles of vinyltoluene having a weight average molecular weight of more than 20.000 and a stereoregularity of the syndiotactic type of more than 90%.

11 Claims, No Drawings

SYNDIOTACTIC TERPOLYMERS OF STYRENE

The present invention relates to terpolymers based on styrene, p-methylstyrene and m-methylstyrene having the aromatic rings linked to the polymeric chain in syndiotactic configuration. These copolymers have lower melting points than the syndiotactic polystyrene homopolymer.

Polystyrene is a thermoplastic polymer obtained by the radicalic polymerization of styrene and is used in the production of moulded articles, films, electric materials, materials for packaging, etc. It is an amorphous atactic polymer with excellent insulating properties and reasonable thermal resistance. For numerous applications it is preferable however to use crystalline materials, with a high thermal resistance and resistance to solvents, characteristics which atactic polystyrene does not have.

European patent 210.615 describes a polystyrene having a structure characterized by an extremely high degree of stereoregularity, in which the phenyl substituents are arranged to give a syndiotactic polymer. This material does not have the above disadvantages of atactic polystyrene as it is crystalline and therefore, once transformed, can be subjected to orientation processes, it is insoluble in almost all organic solvents and has a melting point within the range of 260°–280° C., giving it a high thermal resistance, comparable to or higher than that of condensation thermoplastic polymers (polyesters, polyamides, polyimides, etc.).

Syndiotactic polystyrene can be prepared according to what is described in literature, for example according to European patent EP 272.584 or U.S. Pat. No. 4,978,730, for polymerization catalyzed by compounds of Ti, Zr, V, Ni, in the presence of a co-catalyst represented by methylaluminoxane (a mixture which can contain cyclic, linear and caged oligomers containing the repetitive unit —AlCH$_3$O—) or, as described in published European patent application 421.659, from derivatives of boron containing fluorinated groups.

The high melting point of syndiotactic polystyrene represents on the one hand a desired characteristic and on the other hand a problem. In fact in order to be processed (for example by extrusion, filming, injection moulding, etc.) syndiotactic polystyrene requires operating temperatures of at least 300° C. (very close to the depolymerization temperature) which in the transformation phase cause degradation, with the development of unpleasant smelling and toxic volatile products and the undesired colouring.

To limit these disadvantages, suitable stabilizers can be added to the polymer but in this way the reductions in the molecuar weight are dramatic, as is clearly indicated in U.S. Pat. No. 5,166,238.

The Applicant has now found that it is possible to prepare syndiotactic terpolymers of styrene using vinyltoluene as comonomer. These terpolymers maintain the desired characteristics of the homopolymer, but at the same time have lower melting points.

The present invention therefore relates to syndiotactic terpolymers of styrene comprising repetitive units deriving from:

a) 99.5–60% in moles of styrene; and
b) 0.5–40% in moles of vinyltoluene having a weight average molecular weight of more than 20,000 and a stereoregularity of the syndiotactic type of more than 90%.

More specifically, the present invention relates to syndiotactic terpolymers of styrene comprising repetitive units deriving from:

A) 99.5–60% in moles of styrene;
B) 0.1–15% in moles of p-methylstyrene; and
C) 0.4–25% in moles of m-methylstyrene having a weight average molecular weight of more than 20.000 and a stereoregularity of the syndiotactic type of more than 90%.

The terpolymers of the present invention preferably have a weight average molecular weight of between 50,000 and 500,000 and a stereoregularity of the syndiotactic type of between 95 and 100%. In addition, these materials have melting points which are 10°–60° C. lower than those of the syndiotactic homopolymer of styrene, independently of the composition.

A further object of the present invention therefore relates to a process for the reduction of the melting point of the syndiotactic homopolymer of styrene which comprises the copolymerization of styrene with vinyltoluene in the presence of a catalytic system comprising a catalyst selected from titanium, zirconium and hafnium (Group IVb), in any oxidation state, and a co-catalyst selected from aluminoxane and a compound of boron having formula (I):

$$BX_1X_2X_3 \qquad (I)$$

or one of its salts, wherein $X_1$, $X_2$ and $X_3$, the same or different, represent a $C_1$–$C_{20}$ perfluorinated hydrocarbon radical.

The use of vinyltoluene (a mixture containing about 35–40% by weight of p-methylstyrene and 60–65% of m-methylstyrene) makes the production process of syndiotactic polystyrene very simple as it does not require the two isomers to be obtained in the pure state, by costly techniques such as crystallization at low temperature or chromatographic separation, even if a reduction in the melting point of the homopolymer can be obtained using the isomers singly. In addition, it has been observed that the use of vinyltoluene gives considerable increases in the yield and in the fraction of syndiotactic portion in the polymer obtained, with respect to the values obtained using p-methylstyrene alone or m-methylstyrene alone.

According to the process of the present invention, the styrene/vinyltoluene mixture is such as to give a final polymer with a content of repetitive units (a) and (b) as specified above. This result can be obtained by feeding a monomeric mixture to the copolymerization in which the concentration of vinyltoluene is between 0.1 and 30% in volume (referring to the liquid phase).

The catalyst of titanium, zirconium or hafnium in any oxidation state can be present in the form of:

acetylacetonates;

halides, for example, chloride, bromide, etc;

$C_1$–$C_6$ alcoholates such as methoxide, ethoxide, propoxide, isopropoxide, butoxide, etc;

amides, such as tetra(dimethylamino)titanium or tetra(diethylamino)titanium, described in U.S. Pat. No. 5,045,517;

$C_1$–$C_{20}$ carboxylates such as acetate, benzoate, propionate, etc;

metallocenes such as cyclopentadienyl titanium trichloride, cyclopentadienyl titanium dichloride, pentamethylcyclopentadienyl titanium trichloride, cyclopentadienyl titanium alkoxides or dicyclopentadienyl titanium alkoxides, in which the alkoxide group contains from 1 to 4 carbon atoms, cyclopentadienyl titanium alkyls, pentamethylcyclopentadienyl titanium alkyls, in which the alkyl group contains from 1 to 4 carbon atoms, dicyclopentadienyl titanium dichloride, etc., and the corresponding derivatives of zirconium and hafnium;

metal alkyls or alkylaryls, in which the alkyl or alkylaryl group contains from 1 to 12 carbon atoms, such as titanium tetrabenzyl, zirconium tetrabenzyl, hafnium tetrabenzyl, titanium tetramethyl, zirconium tetramethyl, titanium tetraethyl, zirconium tetraethyl, etc.

The above catalysts are known in literature and described, for example, in U.S. Pat. No. 4,680,353 or in Macromolecules, 21, 3356, (1982) or in Macromolecules, 22, 2129, (1989). They are used in such quantities that the molar ratio between styrene monomers (styrene+vinyltoluene) and metal is between 1,000 and 100,000.

Preferred catalysts according to the present invention are alkoxides, cyclopentadienyl derivatives and pentamethylcyclopentadienyl derivatives of titanium.

The aluminoxane co-catalyst consists essentially of mixtures of products having linear, cyclic or caged structures. The linear structure has general formula (II):

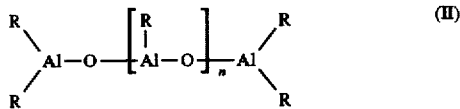

whereas the cyclic structure has general formula (III):

wherein n represents an integer between 1 and 40 and R a $C_1$–$C_{20}$, preferably $C_1$–$C_8$, alkyl radical; a $C_6$–$C_{20}$, preferably $C_6$–$C_{12}$, aryl radical; a $C_7$–$C_{20}$, preferably $C_7$–$C_{12}$, arylalkyl or alkylaryl radical; or a $C_3$–$C_{20}$, referably $C_5$–$C_8$, cycloalkyl radical; or an O—R' radical, wherein R' represents a $C_1$–$C_8$, preferably $C_1$–$C_4$, alkyl radical; a $C_6$–$C_{20}$, preferably $C_6$–$C_{12}$ aryl radical; or a halogen atom, such as chlorine, fluorine or bromine, provided that not all the R radicals are contemporaneously O—R' or halogens. Caged structures are described in Macromolecular Symposia, Vol 97, 1995.

The above co-catalysts are known in literature and described, for example, in published European patent applications 272.584 and 421.659 or in U.S. Pat. No. 4,978,730. The co-catalyst having general formula (I), or its salt, is known in literature and is described in published European patent applications 421.659 and 482.934.

Preferred co-catalysts are boron tris(pentafluorophenyl) and methylaluminoxane with a number average molecular weight Mn of between 400 and 2,000. The cocatalyst is generally used in such quantities that the molar ratio alumino/metal group IVa is between 50 and 1000 or that the ratio boron/metal group IVa is between 0.5 and 5.

According to the process of the present invention, the catalytic system described above can also, optionally, comprise an aluminium alkyl in which the alkyl group contains from 1 to 6 carbon atoms, for example aluminium trimethyl, aluminium triethyl, aluminium triisobutyl, etc., in such quantities that the molar ratio aluminium alkyl/metal group IVa is between 0 and 1,000.

The polymerization reaction can be carried out in mass or in a solvent. In the latter case, the solvent can consist of aliphatic or aromatic hydrocarbons or their mixtures in such quantities that the ratio in volume solvent/monomers is between 0 and 10. The preferred solvent is toluene.

According to a general procedure adopted for this type of reaction, the styrene and vinyltoluene are subjected, before polymerization, to treatment to eliminate catalytic poisons, such as phenol stabilizers, water, phenylacetylene, consisting in distillation, passage on columns containing activated molecular sieves or activated alumina, etc. The monomers and, optionally, the solvent are charged into the reaction equipment together with the optional aluminium alkyl and co-catalyst. After a time varying from 5 seconds to 30 minutes a solution of the metal compound of group IVa is added. The reaction proceeds for times ranging from 15 minutes to 10 hours at temperatures of between 20° and 100° C. At the end, the polymer obtained is recovered according to the traditional methods.

Some illustrative examples are given below to provide a better understanding of the present invention and for its embodiment without limiting the scope of the invention itself.

Analysis procedure

The percentage of syndiotactic polymer is determined by extracting the polymer with acetone or methylethylketone (MEK) at boiling point for 10–20 hours.

The degree of stereoregularity is determined by nuclear magnetic resonance spectroscopy of carbon 13 as described in U.S. Pat. No. 4,680,353.

The monomeric composition is determined by nuclear magnetic resonance spectroscopy of the proton.

The thermal transition temperatures (Tm=melting point, Tg=glass transition temperature, Tcc=crystallization temperature from the molten state (rate of decrease 10° C./min) are determined by differential scanning calorimetry.

The molecular weights of the polymers obtained 20 were determined by Gel Permeation Chromatography in trichlorobenzene at 135° C.

EXAMPLE 1

16 ml of styrene purified by passage on a basic alumina column, 4 ml of vinyltoluene (mixture containing 64% of m-methylstyrene and 36% of p-methylstyrene) purified by passage on a basic alumina column and 4.8 ml of a 1.57 M solution of methylaluminoxane in toluene (number weight molecular weight, Mn, of the methylaluminoxane=900) were introduced into a tailed test-tube in an inert atmosphere.

After 5 minutes 0.5 ml of an 0.05M solution of titanium tetraethoxide in toluene were introduced. The reaction was carried out for 5 hours at 60° C. At the end the mixture was suspended in 200 ml of methanol containing 2 ml of concentrated HCl and filtered.

The solid was again suspended in methanol, filtered and dried under vacuum. 10.3 g (57% yield) of terpolymer were obtained.

Fraction insoluble in methylethylketone (MEK): 42%

Weight average molecular weight (Mw)=201,000

Number average molecular weight (Mn)=134,000

13-C NMR analysis shows that the polymer has a percentage of syndiotactic pentads of more than 95%.

Thermal properties: Tm=211° C.; Tg=91° C.

Molar composition of the terpolymer:

para=7.6%; meta =17.5%.

EXAMPLE 2

18 ml of styrene purified by passage on a basic alumina column, 2 ml of vinyltoluene purified by passage on a basic alumina column and 4.8 ml of a 1.57M solution of methylaluminoxane in toluene (Mn=900) were introduced into a tailed test-tube in an inert atmosphere.

After 5 minutes 0.5 ml of an 0.05M solution of titanium tetraethoxide in toluene were introduced. The reaction was carried out for 5 hours at 60° C. At the end the mixture was suspended in 200 ml of methanol containing 2 ml of concentrated HCl and filtered.

The solid was again suspended in methanol, filtered and dried under vacuum. 7.65 g (42% yield) of terpolymer were obtained.

Fraction insoluble in MEK: 94%

Mw=214,000

Mn=112,000

13-C NMR analysis shows that the polymer has a percentage of syndiotactic pentads of more than 95%.

Tm=236° C.; Tcc=166° C.; Tg=94° C.

para=4.1%; meta=9.2%.

EXAMPLE 3

19 ml of styrene purified by passage on a basic alumina column, 1 ml of vinyltoluene purified by passage on a basic alumina column and 4.8 ml of a 1.57M solution of methylaluminoxane in toluene (Mn=900) were introduced into a tailed test-tube in an inert atmosphere.

After 5 minutes 0.5 ml of an 0.05M solution of titanium tetraethoxide in toluene were introduced. The reaction was carried out for 5 hours at 60° C. At the end the mixture was suspended in 200 ml of methanol containing 2 ml of concentrated HCl and filtered.

The solid was again suspended in methanol, filtered and dried under vacuum. 8.78 g (50% yield) of terpolymer were obtained.

Fraction insoluble in MEK: 97%

Mw=178,000

Mn=86,000

13-C NMR analysis shows that the polymer has a percentage of syndiotactic pentads of more than 95%.

Tm=251° C.; Tcc=191° C.; Tg=96° C.

para=2.2%; meta=4.7%.

EXAMPLE 4

19 ml of styrene purified by passage on a basic alumina column, 1 ml of vinyltoluene purified by passage on a basic alumina column and 4.8 ml of a 1.57M solution of methylaluminoxane in toluene (Mn=900) were introduced into a tailed test-tube in an inert atmosphere.

After 5 minutes 2.5 ml of an 0.0125M solution of titanium tetraethoxide in toluene were introduced. The reaction was carried out for 5 hours at 60° C. At the end the mixture was suspended in 200 ml of methanol containing 2 ml of concentrated HCl and filtered.

The solid was again suspended in methanol, filtered and dried under vacuum. 5.32 g (29.3% yield) of terpolymer were obtained.

Fraction insoluble in MEK: 96%

Mw=260,000

Mn=104,000

13-C NMR analysis shows that the polymer has a percentage of syndiotactic pentads of more than 95%.

Tm=248° C.; Tcc=190° C.; Tg=95° C.

para=2.4%; meta=4.9%.

EXAMPLE 5

19 ml of styrene purified by passage on a basic alumina column, 1 ml of vinyltoluene purified by passage on a basic alumina column and 0.24 ml of a 1.57M solution of methylaluminoxane in toluene (Mn=900) were introduced into a tailed test-tube in an inert atmosphere.

After 5 minutes 0.2 ml of an 0.0125M solution of cyclopentadienyl titanium trichloride in toluene were introduced. The reaction was carried out for 2 hours at 60° C. At the end the mixture was suspended in 200 ml of methanol containing 0.5 ml of concentrated HCl and filtered.

The solid was again suspended in methanol, filtered and dried under vacuum. 0.78 g (4.3% yield) of rpolymer were obtained.

Fraction insoluble in MEK: 78%

Mw=103,000

Mn=52,000

13-C NMR analysis shows that the polymer has a ercentage of syndiotactic pentads of more than 95%.

Tm=234° C.; Tcc=183° C.; Tg=90° C.

para=1.9%; meta=5.8%.

EXAMPLE 6

19 ml of styrene purified by passage on a basic alumina column, 1 ml of vinyltoluene purified by passage on a basic alumina column and 0.72 ml of a 1.57M solution of methylaluminoxane in toluene (Mn=900) were introduced into a tailed test-tube in an inert atmosphere.

After 5 minutes 0.3 ml of an 0.025M solution of titanium tetraethoxide in toluene were introduced. The reaction was carried out for 5 hours at 60° C. At the end the mixture was suspended in 200 ml of methanol containing 0.5 ml of concentrated HCl and filtered.

The solid was again suspended in methanol, filtered and dried under vacuum. 1.70 g (9.4% yield) of terpolymer were obtained.

Fraction insoluble in MEK: 46%

Mw=220,000

Mn=103,000

13-C NMR analysis shows that the polymer has a percentage of syndiotactic pentads of more than 95%.

Tm=245° C.; Tcc=199° C.; Tg=94° C.

para=2.7%; meta=6.0%.

EXAMPLE 7

19 ml of styrene purified by passage on a basic alumina column, 1 ml of vinyltoluene purified by passage on a basic alumina column and 2.0 ml of a 1.57M solution of methylaluminoxane in toluene (Mn=900) were introduced into a tailed test-tube in an inert atmosphere.

After 5 minutes 0.43 ml of an 0.0146M solution of (cyclopentadienyl) titaniumtrichloride in toluene were introduced. The reaction was carried out for 4 hours at 60° C. At the end the mixture was suspended in 200 ml of methanol containing 0.5 ml of concentrated HCl and filtered.

The solid was again suspended in methanol, filtered and dried under vacuum. 2.27 g (12.5% yield) of terpolymer were obtained.

Fraction insoluble in MEK: 32%

Mw=123,000

Mn=51,000

13-C NMR analysis shows that the polymer has a percentage of syndiotactic pentads of more than 95%.

Tm=238° C.; Tcc=189° C.; Tg=95° C.

para=1.6%; meta=5.4%.

EXAMPLE 8

19.8 ml of styrene purified by passage on a basic alumina column, 0.2 ml of vinyltoluene purified by passage on a basic alumina column and 4.8 ml of a 1.57M solution of methylaluminoxane in toluene (Mn=900) were introduced into a tailed test-tube in an inert atmosphere.

After 5 minutes 0.5 ml of an 0.05M solution of titanium tetraethoxide in toluene were introduced.

The reaction was carried out for 5 hours at 60° C. At the end the mixture was suspended in 200 ml of methanol containing 2 ml of concentrated HCl and filtered.

The solid was again suspended in methanol, filtered and dried under vacuum. 4.60 g (25% yield) of terpolymer were obtained.

Fraction insoluble in MEK: 92%

Mw=191,000

Mn=92,000

13-C NMR analysis shows that the polymer has a percentage of syndiotactic pentads of more than 95%.

Tm=260° C.; Tcc=217° C.; Tg=96° C.

para=0.5%; meta=1.1%.

EXAMPLE 9

This example describes a preparation which is analogous to that described in example 3, but without the use of any comonomer.

20 ml of styrene purified by passage on a basic alumina column and 4.8 ml of a 1.57M solution of methylaluminoxane in toluene (Mn=900) were introduced into a tailed test-tube in an inert atmosphere.

After 5 minutes 0.5 ml of an 0.05M solution of titanium tetraethoxide in toluene were introduced. The reaction was carried out for 5 hours at 60° C. At the end the mixture was suspended in 200 ml of methanol containing 2 ml of concentrated HCl and filtered.

The solid was again suspended in methanol, filtered and dried under vacuum. 2.28 g (12% yield) of terpolymer were obtained.

Fraction insoluble in MEK: 41%

Mw=313,000

Mn=125,000

13-C NMR analysis shows that the polymer has a percentage of syndiotactic pentads of more than 95%.

Tm=265° C.; Tcc=233° C.; Tg=96° C.

We claim:

1. Syndiotactic terpolymers of styrene comprising repetitive units deriving from:
   a) 99.5–60% in moles of styrene; and
   b) 0.5–40% in moles of vinyltoluene having a weight average molecular weight of more than 20,000 and less than or equal to 500,000 and a stereoregularity of the syndiotactic type of more than 90%.

2. Terpolymers according to claim 1, wherein the weight average molecular weight is between 50,000 and 500,000 and the stereoregularity of the syndiotactic type is between 95 and 100%.

3. Terpolymers according to claim 1, having melting points of 10°–60° C. lower than those of the syndiotactic homopolymer of styrene.

4. Process for reducing the melting point of the syndiotactic homopolymer of styrene which consists in the copolymerization of styrene with vinyltoluene in the presence of a catalytic system comprising a catalyst selected from titanium, zirconium and hafnium, in any oxidation state, and a co-catalyst selected from aluminoxane and a compound of boron having the formula

wherein $X_1$, $X_2$ and $X_3$, the same or different, represent a $C_1$–$C_{20}$ perfluorinated hydrocarbon radical, said process producing a syndiotactic terpolymer.

5. Process according to claim 4, wherein the vinyltoluene consists essentially of a mixture containing about 35–40% by weight of p-methylstyrene and 60–65% of m-methylstyrene.

6. Process according to claim 4, wherein the concentration of vinyltoluene in the reaction mixture is between 0.1 and 30% in volume.

7. Process according to claim 4 wherein the catalyst of titanium, zirconium or hafnium in any oxidation state is present in the form of:

acetylacetonates;

halides;

$C_1$–$C_6$ alcoholates;

amides;

$C_1$–$C_{20}$ carboxylates metallocenes;

metal alkyls or alkylaryls, wherein the alkyl or alkylaryl group contains from 1 to 12 carbon atoms.

8. Process according to claim 4 wherein the catalyst is used in such quantities that the molar ratio between styrene monomers (styrene+vinyltoluene) and metal is between 1,000 and 100,000.

9. Process according to claim 4 wherein the aluminoxane co-catalyst comprises linear or cyclic structures having general formula (II) or (III):

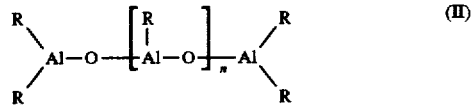

wherein n represents an integer between 1 and 40 and R a $C_1$–$C_{20}$ alkyl radical; a $C_6$–$C_{20}$ aryl radical; a $C_7$–$C_{20}$ arylalkyl or alkylaryl radical; or a $C_3$–$C_{20}$ cycloalkyl radical; or an O—R' radical, wherein R' represents a $C_1$–$C_8$ alkyl radical; a $C_6$–$C_{20}$ aryl radical; or a halogen atom provided that not all the R radicals are contemporaneously O—R' or halogens.

10. Process according to claim 4 wherein the co-catalyst is used in such quantities that the molar ratio alumino/metal group IVa is between 50 and 1000 or that the ratio boron/metal group IVa is between 0.5 and 5.

11. Process according to claim 4, wherein the catalytic system also comprises an aluminium alkyl in such quantities that the molar ratio of the aluminium alkyl to the catalyst is greater than 0 and less than or equal to 1000.

* * * * *